(12) United States Patent
Zhang

(10) Patent No.: US 11,876,237 B2
(45) Date of Patent: Jan. 16, 2024

(54) CYLINDRICAL WATERPROOF BATTERY BOX

(71) Applicant: Xiaofeng Zhang, Zhejiang (CN)

(72) Inventor: Xiaofeng Zhang, Zhejiang (CN)

( * ) Notice: Subject to any disclaimer, the term of this patent is extended or adjusted under 35 U.S.C. 154(b) by 49 days.

(21) Appl. No.: 17/685,387

(22) Filed: Mar. 3, 2022

(65) Prior Publication Data

US 2022/0190420 A1   Jun. 16, 2022

(30) Foreign Application Priority Data

Jul. 5, 2021   (CN) .......................... 202121514586.5

(51) Int. Cl.
*H01M 50/213* (2021.01)
*H01M 50/24* (2021.01)
*H01M 50/271* (2021.01)
*H01M 50/284* (2021.01)

(52) U.S. Cl.
CPC ......... *H01M 50/213* (2021.01); *H01M 50/24* (2021.01); *H01M 50/271* (2021.01); *H01M 50/284* (2021.01)

(58) Field of Classification Search
CPC ....... H01M 50/20–216; H01M 50/233; H01M 50/24; H01M 50/244–247; H01M 50/262–264; H01M 50/271–273; H01M 50/284–287; H01M 50/289–293; H01M 50/298
See application file for complete search history.

(56) References Cited

U.S. PATENT DOCUMENTS

| | | | | |
|---|---|---|---|---|
| 3,941,618 | A * | 3/1976 | Mabuchi | H01M 50/213 429/99 |
| 9,725,213 | B2 * | 8/2017 | Weyrauch | B29C 45/14336 |
| 2007/0003825 | A1 * | 1/2007 | Touchton | H01M 50/213 429/97 |
| 2007/0182363 | A1 * | 8/2007 | Yang | H01M 10/46 320/107 |
| 2013/0236774 | A1 * | 9/2013 | Liu | H01M 10/46 429/179 |

(Continued)

FOREIGN PATENT DOCUMENTS

| | | | | |
|---|---|---|---|---|
| CN | 105140434 A | * | 12/2015 | ............ H01M 50/20 |
| CN | 107799689 A | * | 3/2018 | ............ H01M 50/20 |
| CN | 108336258 A | * | 7/2018 | ............ H01M 50/24 |

OTHER PUBLICATIONS

Machine translation of Li, CN-105140434-A. Originally available Dec. 9, 2015. (Year: 2015).*

(Continued)

*Primary Examiner* — Jonathan Crepeau
*Assistant Examiner* — Jacob Buchanan
(74) *Attorney, Agent, or Firm* — JCIPRNET

(57) ABSTRACT

The present invention discloses a cylindrical waterproof battery box, including a box body, a compartment body, and a box cover. One end of the box body is provided with a mounting opening, the compartment body is configured to be mounted into the mounting opening and extend to an inner cavity of the box body, the box cover and the compartment body are assembled to form an external thread assembly portion, an internal thread portion is disposed in the mounting opening, and the external thread assembly portion is configured to be fitted with the internal thread portion.

6 Claims, 8 Drawing Sheets

(56) References Cited

U.S. PATENT DOCUMENTS

2013/0343042 A1* 12/2013 Windom ................ F21L 4/005
362/183

OTHER PUBLICATIONS

Machine translation of Li, CN-107799689-A. Originally available Mar. 13, 2018. (Year: 2018).*
Machine translation of Chu (CN 108336258). Originally available Jul. 27, 2018. (Year: 2018).*

* cited by examiner

CYLINDRICAL WATERPROOF BATTERY BOX

CROSS-REFERENCE TO RELATED APPLICATION

This application claims the priority benefit of China application serial no. 202121514586.5, filed on Jul. 5, 2021. The entirety of the above-mentioned patent application is hereby incorporated by reference herein and made a part of this specification.

FIELD OF TECHNOLOGY

The present invention relates to the field of waterproof battery box technologies, and in particular to a cylindrical waterproof battery box.

BACKGROUND

Battery boxes are widely used in various decorative lighting places. Currently, most of the used battery boxes are used indoors, because the battery box is easy to take in water when being used outdoors, which causes a short-circuit fault and makes it unable to work normally.

With the popularization of LED lamp string decoration, a growing number of decorative lamps are applied to outdoor lighting decoration. Therefore, there are also some battery boxes used in outdoor in the market, facilitating power supply for outdoor decorative light strings. Existing decorative lamp battery boxes are configured to be connected to LED color light and control on-off and a lighting action of the color lamps. However, due to long-term use outdoor, the outdoor battery box is easy to crack during use, affecting the waterproof and sealing performance. In addition, most of the existing battery boxes are integrated with a switch control board, and a control line is led out from a connection position between a box body and a box cover, resulting in a problem of poor waterproof effect, and in an existing design of battery boxes, 3AA battery boxes are usually used, and there is a certain use limitation in power supply in a use process.

SUMMARY

An objective of the present invention is to provide a cylindrical waterproof battery box for resolving the foregoing technical problems. Through threaded fitting, the sealing connectivity of an inner cavity of the battery box is enhanced and the overall aesthetic appearance is improved.

The technical problem of the present invention may be resolved by using the following technical solutions.

A cylindrical waterproof battery box is provided, including a box body, a compartment body, and a box cover, where one end of the box body is provided with a mounting opening, the compartment body is configured to be mounted into the mounting opening and extend to an inner cavity of the box body, the box cover and the compartment body are assembled to form an external thread assembly portion, an internal thread portion is disposed in the mounting opening, and the external thread assembly portion is configured to be fitted with the internal thread portion.

The compartment body and the box cover are of a split structure and the box cover can be clamped and fixed to one end of the compartment body in a fitting manner.

The box cover includes an end cover portion, box cover thread portions arranged symmetrically on two sides, and a clamping buckle located between the two box cover thread portions, the compartment body includes a battery compartment box and a compartment cover portion located on one end of the battery compartment box, the compartment cover portion includes a cover ring and a cavity groove, clamping grooves are provided on an inner wall of the cavity groove, and the clamping grooves are configured to be fixed to the clamping buckle in a fitting manner; and after the box cover is assembled with the compartment body, the box cover thread portion fills a part of the cavity groove.

Compartment body thread portions arranged symmetrically can further be disposed on the compartment cover portion, and after the box cover is assembled with the compartment body, the box cover thread portions and the compartment body thread portions are combined to form the external thread assembly portion.

When the box cover and the compartment body are assembled, a first waterproof sealing ring is disposed between the box cover and the compartment body, and when the external thread assembly portion is fitted with the internal thread portion, a second waterproof sealing ring is disposed between the external thread assembly portion and the internal thread portion.

Three, four, six, or eight battery groove units are disposed in the battery compartment box.

A through output line hole is provided in the box cover, and a melt glue groove is provided in the corresponding box cover. The melt glue groove is configured for injecting a melt glue to seal a gap between a wire and the output line hole, to achieve a waterproof effect.

An accommodating cavity capable of accommodating a switch circuit board is formed after the box cover and the compartment body are assembled, the switch circuit board is mounted in the accommodating cavity, a switch hole is provided in an end cover portion of the box cover, a switch handle in the switch circuit board extends outward through the switch hole, the switch hole is provided with a button plug in a fitting manner, and an outer end of the switch handle is configured to be fitted with the button plug.

The compartment body and the box cover are of an integral structure, the box cover is located at an end portion of the compartment body, the external thread assembly portion is at a connection position between the box cover and the compartment body, an assembly groove is provided on the compartment body, the assembly groove is adjacent to the box cover, and the assembly groove is configured to be fitted with the switch circuit board.

A first battery accommodating groove is provided in the compartment body, the first battery accommodating groove is adjacent to the assembly groove, two battery groove units are disposed in the first battery accommodating groove, a second battery accommodating groove is further provided in the compartment body, four battery groove units are disposed in the second battery accommodating groove, and the second battery accommodating groove and the first battery accommodating groove are disposed opposite to each other.

A battery pressing plate is disposed at an upper edge of the battery groove unit.

The present invention has the following outstanding advantages and effects compared with the related art: by optimizing a design and by using a cylindrical structure design, threaded fastening and fitting among the box cover, the compartment body, and the box body can be implemented, to achieve a good sealing effect; and the structure of the compartment body and the box cover is optimized, and less parts are required, facilitating assembly of a battery box body and assembly between a lamp string and the battery box.

The features of the present invention can be clearly learned by referring to the accompanying drawings of the present invention and a detailed description of the following exemplarily implementations.

DESCRIPTION OF THE EMBODIMENTS

Figure 1:
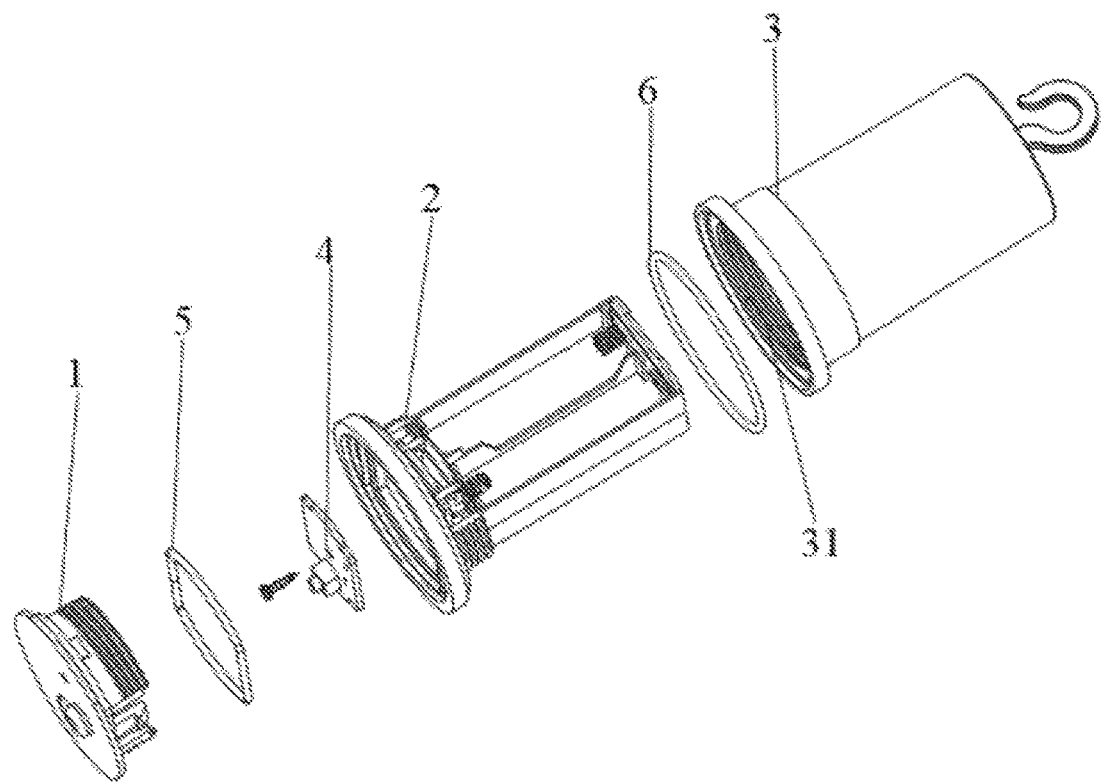
FIG. 1 is a schematic diagram of an entire decomposition structure according to Embodiment 1 of the present invention.

In order to make the technical means, creative features, achievement goals and effects achieved by the present invention easy to understand, the present invention will be further described below in conjunction with specific illustrations.

Embodiment 1

As shown in FIG. 1 to FIG. 8, this embodiment provides a cylindrical waterproof battery box, including a box body 3, a compartment body 2, and a box cover 1, where the box body 3 is disposed in a cylindrical structure.

Preferably, one end of the box body 3 is provided with a mounting opening 32, the compartment body 2 is configured to be mounted into the mounting opening 32 and extend into an inner cavity of the box body 3, the box cover 1 and the compartment body 2 are assembled to form an external thread assembly portion 8, an internal thread portion 31 is disposed in the mounting opening 32 of the box body 3, and the external thread assembly portion 8 is configured to be fitted with the internal thread portion 31. A threaded fixing structure is used, to reduce a sealing space and improve a sealing effect, thereby achieving the better waterproof performance of the battery box.

In one preferred embodiment, the compartment body 2 and the box cover 1 are of a split structure, and the box cover 1 may be clamped and fixed to one end of the compartment body 2 in a fitting manner. The box cover 1 includes an end cover portion 11, box cover thread portions 12 arranged symmetrically on two sides, and a clamping buckle 13 located between the two box cover thread portions 12, the compartment body 2 includes a battery compartment box 21 and a compartment cover portion 22 located on one end of the battery compartment box 21, the compartment cover portion 22 includes a cover ring 221 and a cavity groove 223, clamping grooves 224 are provided on an inner wall of the cavity groove 223, and the clamping grooves 224 are configured to be fixed to the clamping buckle 13 in a fitting manner; and after the box cover 1 is assembled with the compartment body (2), the box cover thread portion 12 fills a part of the cavity groove 223. In addition, the box cover thread portion 12 is fitted with the internal thread portion 31, and a fixing structure of the clamping groove 224 and the clamping buckle 13 is combined, to assemble the compartment body 2 and the box cover 1 with the box body 3.

In one preferred embodiment, the compartment body 2 and the box cover 1 are of a split structure, and the box cover 1 may be clamped and fixed to one end of the compartment body 2 in a fitting manner. The box cover 1 includes an end cover portion 11, box cover thread portions 12 arranged symmetrically on two sides, and a clamping buckle 13 located between the two box cover thread portions 12, the compartment body 2 includes a battery compartment box 21 and a compartment cover portion 22 located on one end of the battery compartment box 21, the compartment cover portion 22 includes a cover ring 221 and compartment body thread portions 222 arranged symmetrically on two sides, and a cavity groove 223 is provided in the compartment cover portion 22; and after the box cover 1 is assembled with the compartment body 2, the box cover thread portion 12 fills a part of the cavity groove 223, and is fitted with the compartment body thread portion 222 to form the external thread assembly portion. The external thread assembly portion 8 is fitted with the internal thread portion 31, to complete entire assembly.

In the embodiments, a through output line hole 16 is provided in the box cover 1, and a melt glue groove is provided in the corresponding box cover 1. The melt glue groove is configured for injecting a melt glue to seal a gap between a wire and the output line hole 16, to achieve a waterproof effect.

In the embodiments, the compartment body 2 and the box cover 1 are disposed in the split structure. An accommodating cavity capable of accommodating a switch circuit board 4 is formed after the box cover 1 and the compartment body 2 are assembled, the switch circuit board 4 is mounted in the accommodating cavity, a switch hole 14 is provided in an end cover portion 11 of the box cover 1, a switch handle in the switch circuit board 4 extends outward through the switch hole 14, the switch hole 14 is provided with a button plug 15 in a fitting manner, where the button plug 15 is preferably an existing flexible rubber button plug, and an outer end of the switch handle is configured to be fitted with the button plug 15. The split design is optimized to facilitate the built-in mounting of the switch circuit board 4, which makes a mounting space of the switch circuit board 4 more compact and reasonable, reduces a volume of the entire battery box, and makes the entire space layout more reasonable and effective.

Preferably, clamping grooves 224 are provided on an inner wall of the compartment body thread portion 222, and the clamping grooves 224 are configured to be fixed to the clamping buckle 13 in a fitting manner, to facilitate combined mounting between the compartment body 2 and the box cover 1.

Preferably, when the box cover 1 and the compartment body 2 are assembled, a first waterproof sealing ring 5 is disposed between the box cover and the compartment body, and when the external thread assembly portion is fitted with the internal thread portion, a second waterproof sealing ring 6 is disposed between the external thread assembly portion and the internal thread portion. A dual-sealing structure is used, to ensure an entire waterproof effect.

Figure 6:
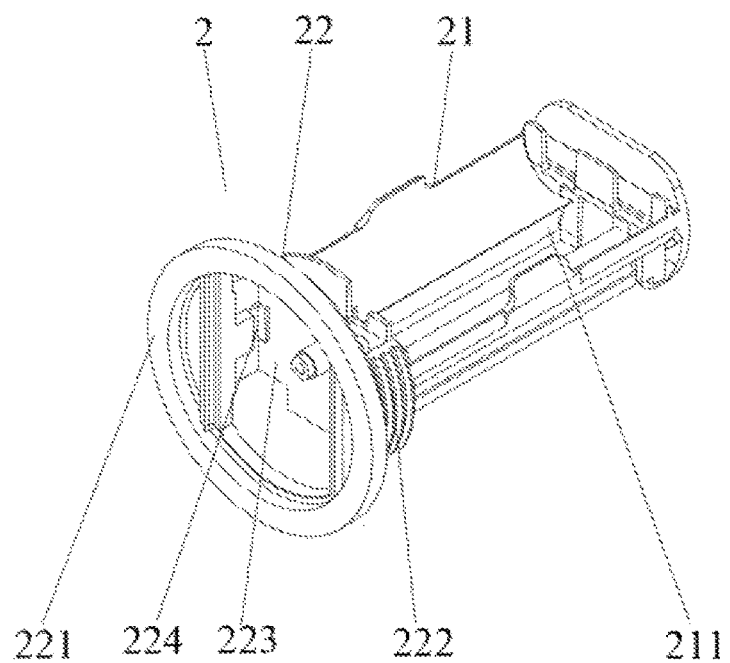
FIG. 6 is a schematic structural diagram of a compartment body according to Embodiment 1 of the present invention.
Figure 7:
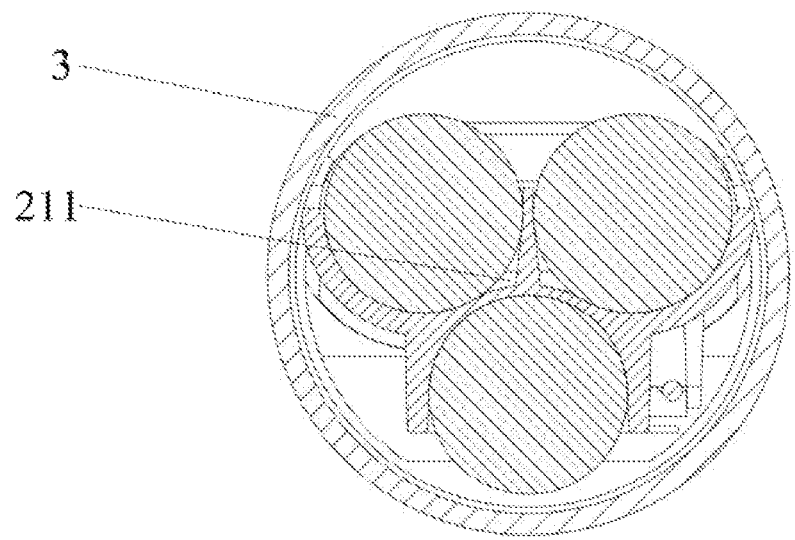
FIG. 7 is a schematic diagram 1 of a mounting structure between a battery compartment box and a battery according to Embodiment 1 of the present invention.

In one preferred embodiment, with reference to FIG. 6 and FIG. 7, three battery groove units 211 are disposed in the battery compartment box 21, and the three battery groove units 211 are arranged in the compartment body 2 in a trisection structure. A design of the preferred split structure of the compartment body 2 and the box cover 1 is combined, to make the entire structure more compact and reasonable, thereby achieving a high utilization rate of a product space.

Figure 2:
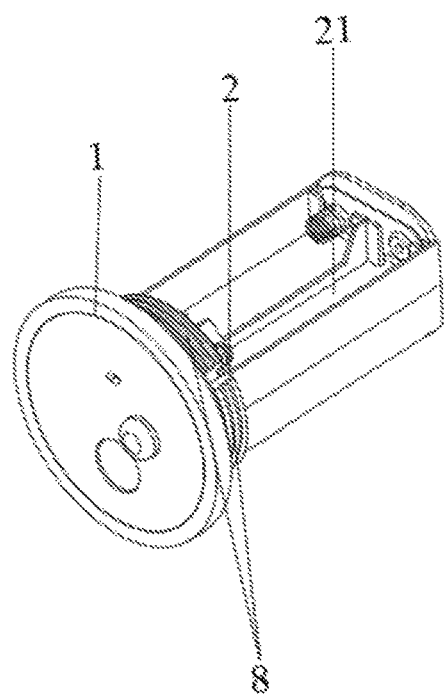
FIG. 2 is a schematic structural diagram of assembly between a box cover and a compartment body according to Embodiment 1 of the present invention.
Figure 3:
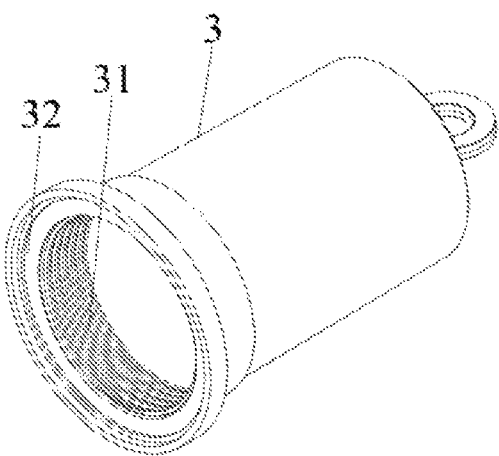
FIG. 3 is a schematic structural diagram of a box body according to Embodiment 1 of the present invention.
Figure 4:
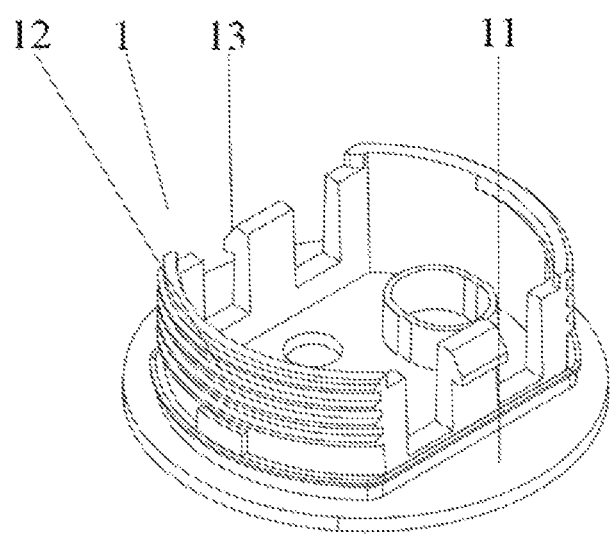
FIG. 4 is a schematic structural diagram 1 of a box cover according to Embodiment 1 of the present invention.
Figure 5:
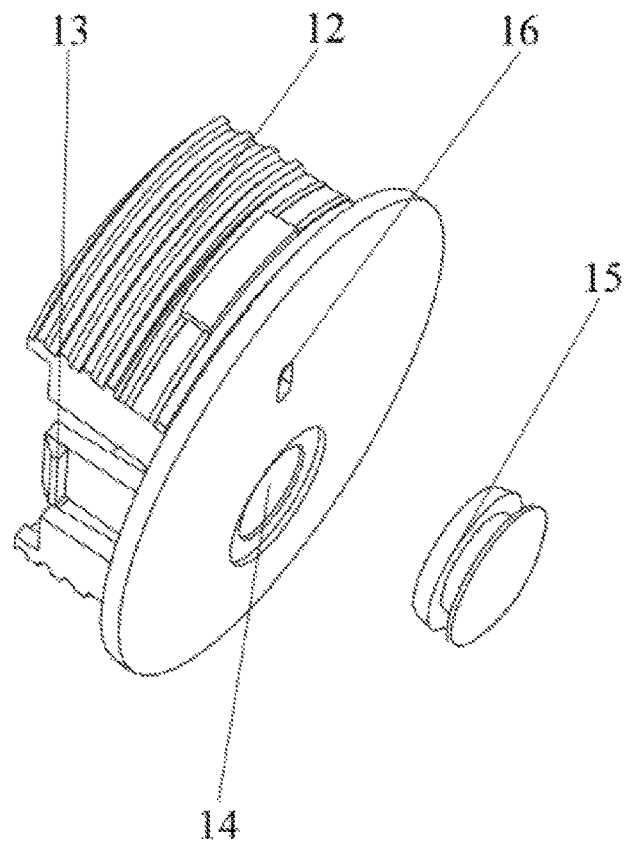
FIG. 5 is a schematic structural diagram 2 of a box cover according to Embodiment 1 of the present invention.
Figure 8:
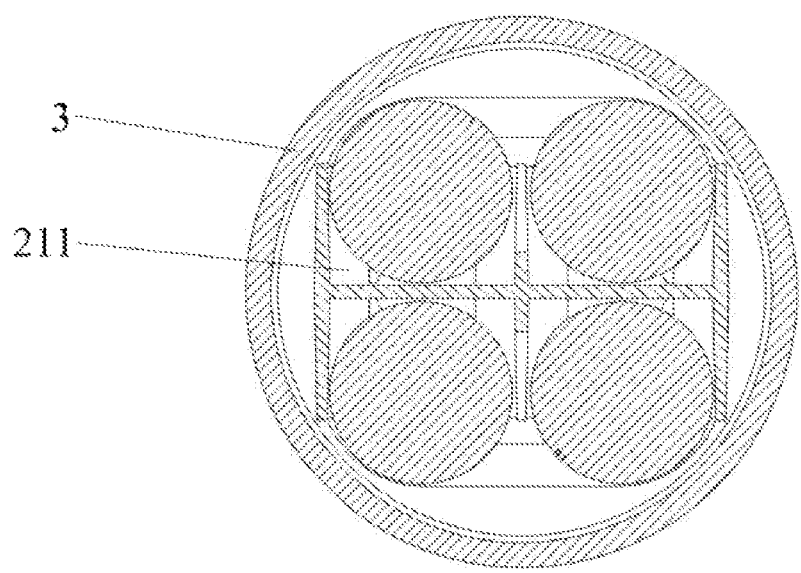
FIG. 8 is a schematic diagram 2 of a mounting structure of a battery compartment box and a battery according to Embodiment 1 of the present invention.
Figure 9:
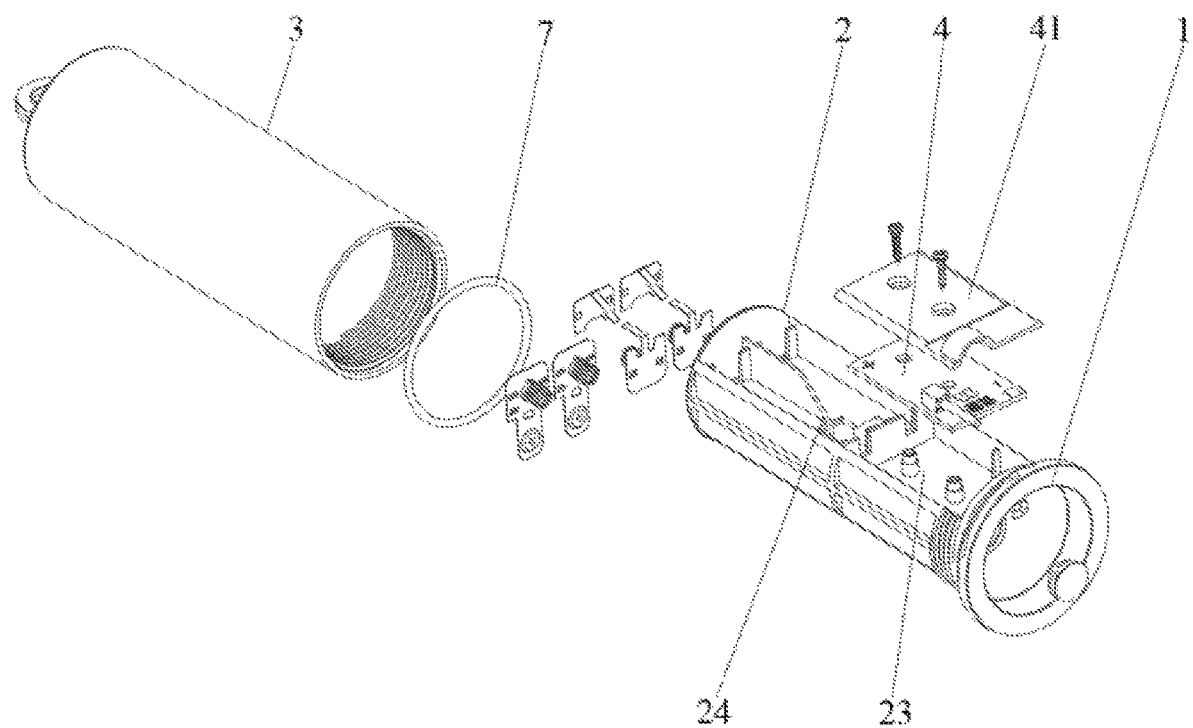
FIG. 9 is a schematic diagram of an entire decomposition structure according to Embodiment 2 of the present invention.
Figure 10:
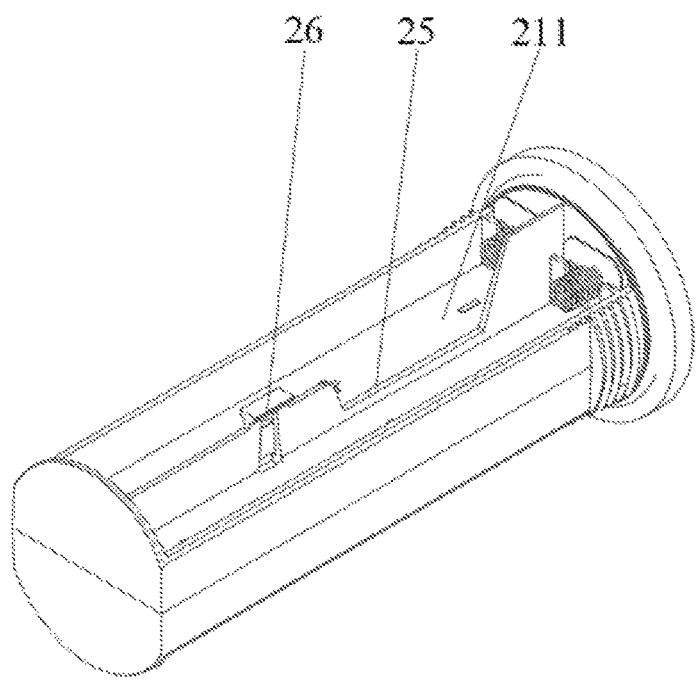
FIG. 10 is a schematic diagram of an entire structure of a box cover and a compartment body according to Embodiment 2 of the present invention.
Figure 11:
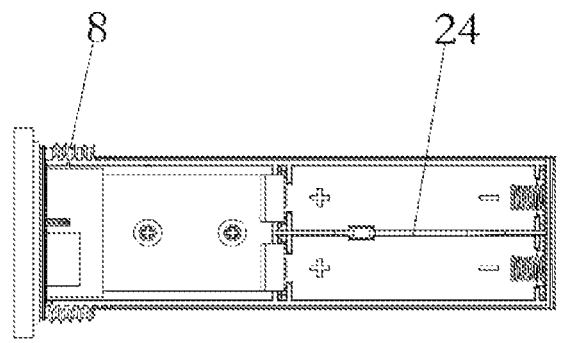
FIG. 11 is a schematic diagram 2 of an entire structure of a box cover and a compartment body according to Embodiment 2 of the present invention.
Figure 12:
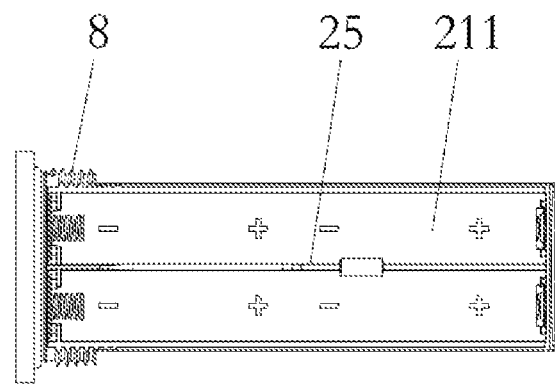
FIG. 12 is a schematic diagram 3 of an entire structure of a box cover and a compartment body according to Embodiment 2 of the present invention.
Figure 13:
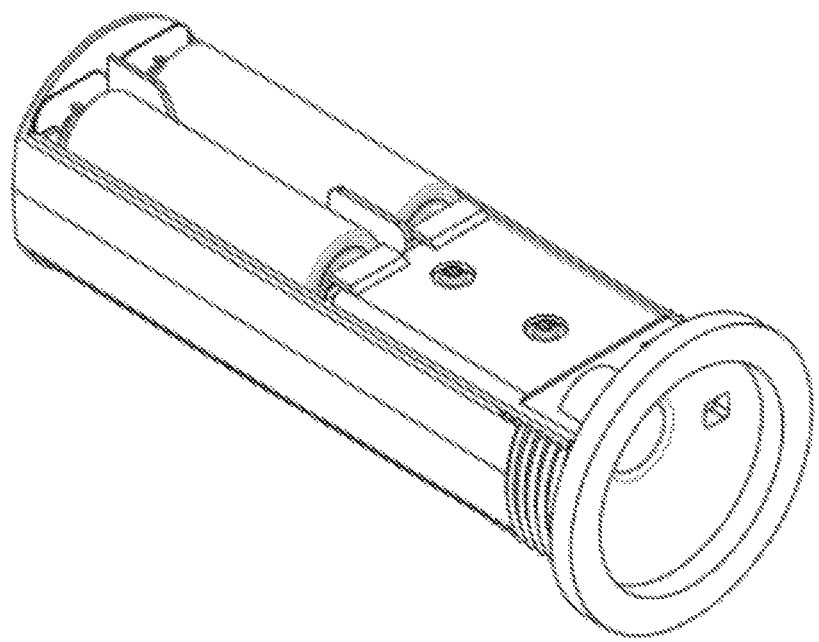
FIG. 13 is a schematic diagram of overall use of a box cover and a compartment body according to Embodiment 2 of the present invention.
Figure 14:
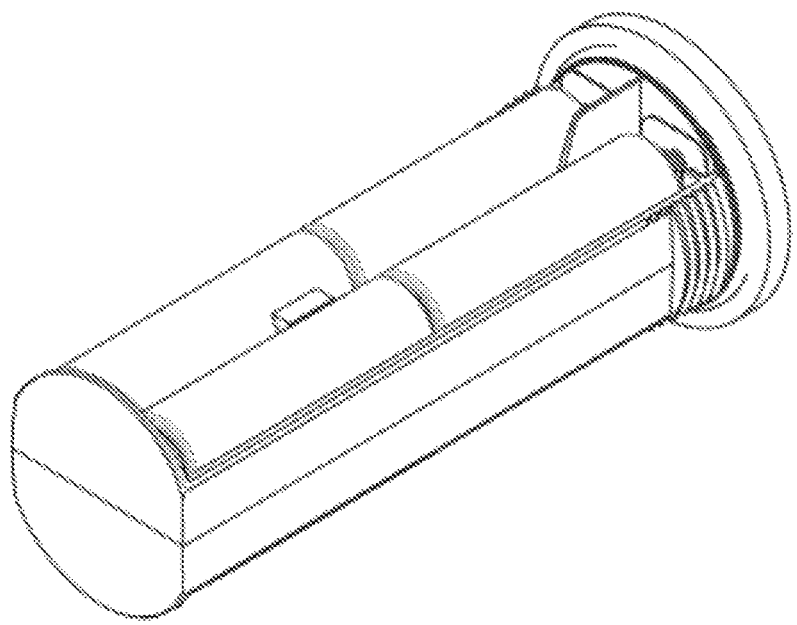
FIG. 14 is a schematic diagram 2 of overall use of a box cover and a compartment body according to Embodiment 2 of the present invention.
Figure 15:
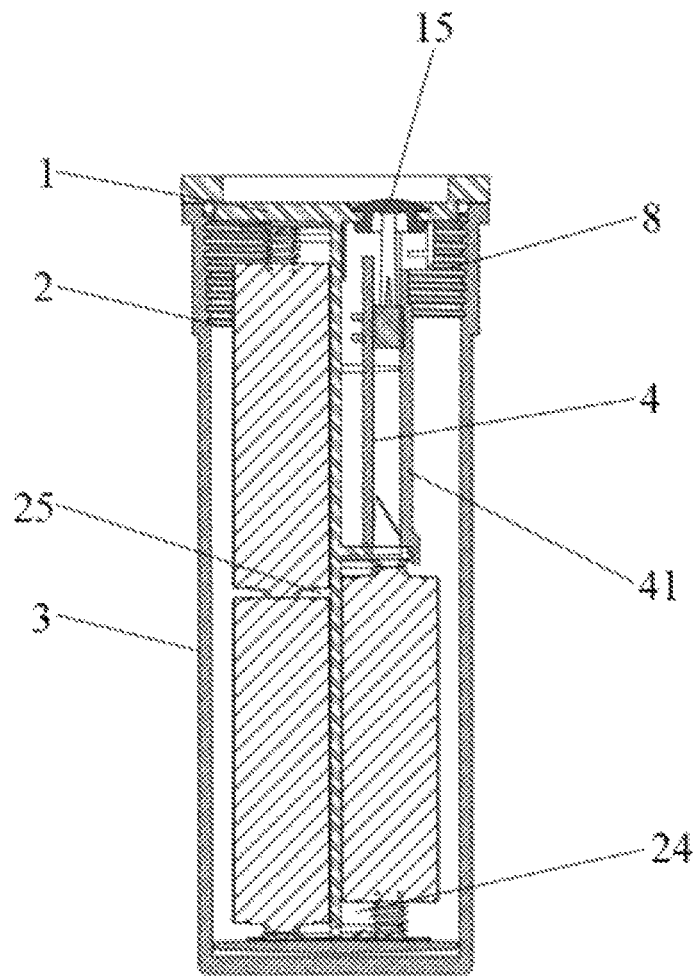
FIG. 15 is a schematic diagram of an entire cross-sectional structure according to Embodiment 2 of the present invention.

In one preferred embodiment, with reference to FIG. 2 and FIG. 8, four battery groove units 211 are disposed in the battery compartment box 21, and the four battery groove units 211 are pairwise symmetrically arranged in the compartment body 2 up and down. A design of the preferred split structure of the compartment body 2 and the box cover 1 is combined, to make the entire structure more compact and reasonable, thereby achieving a high utilization rate of a product space.

In one preferred embodiment, six battery groove units 211 are disposed in the battery compartment box 21, and the six battery groove units 211 are three-three symmetrically arranged in the compartment body up and down. A design of the preferred split structure of the compartment body 2 and the box cover 1 is combined, to make the entire structure more compact and reasonable, thereby achieving a high utilization rate of a product space.

In one preferred embodiment, according to the embodiments, the battery compartment box 21 is lengthened according to a use requirement, so that six or eight battery groove units 211 may be built in the battery compartment box. Preferably, a battery pressing plate 26 is disposed in a fitting manner, to facilitate fixing and mounting of a plurality of batteries.

In the foregoing, preferably, a battery pressing plate 26 is disposed at an upper edge of the battery groove unit 211, and the battery pressing plate 26 is configured to fix a battery mounted in the battery groove unit 211; and a single battery groove unit 211 is configured to mount a single battery in a fitting manner.

Embodiment 2

As shown in FIG. 9 to FIG. 15, this embodiment provides a cylindrical waterproof battery box, including a box body 3, a compartment body 2, and a box cover 1, where the box body 3 is disposed in a cylindrical structure.

Preferably, one end of the box body 3 is provided with a mounting opening 32, the compartment body 2 is configured to be mounted into the mounting opening 32 and extend into an inner cavity of the box body 3, the box cover 1 and the compartment body 2 are integrally formed to form an external thread assembly portion 8, an internal thread portion 31 is disposed in the mounting opening 32 of the box body 3, and the external thread assembly portion 8 is configured to be fitted with the internal thread portion 31. A threaded fixing structure is used, to reduce a sealing space and improve a sealing effect, thereby achieving better waterproof performance of the battery box.

Preferably, the compartment body 2 and the box cover 1 are of an integral structure, the box cover 1 is located at an end portion of the compartment body 2, the external thread assembly portion 8 is at a connection position between the box cover 1 and the compartment body 2, and when the external thread assembly portion 8 is assembled with the box body 3, a sealing ring 7 is disposed between the external thread assembly portion and the box body to improve a waterproof effect. An assembly groove 23 is provided on the compartment body 2, the assembly groove 23 is adjacent to the box cover 1, and the assembly groove 23 is configured to be fitted with a switch circuit board 4. A first battery accommodating groove 24 is disposed in the compartment body 2, the first battery accommodating groove 24 is adjacent to the assembly groove 23, and two battery groove units 211 are disposed in the first battery accommodating groove 24. A second battery accommodating groove 25 is further disposed in the compartment body 2, four battery groove units 211 are disposed in the second battery accommodating groove 25, and the second battery accommodating groove 25 and the first battery accommodating groove 24 are disposed opposite to each other. A single battery groove unit 211 is configured to mount a single battery in a fitting manner.

In this embodiment, the compartment body 2 and the box cover 1 are of an integral structure, which is applicable to a large-capacity waterproof battery box for mounting six batteries. A compartment structure is optimized, the assembly groove 23 is independently disposed, to facilitate mounting of the switch circuit board. A cover plate 41 is generally disposed on an upper part of the switch circuit board 4. By using a design structure in which battery accommodating grooves are opposite, two battery groove units may be arranged on an upper part and four battery groove units may be arranged on a low part, an entire space design of a product is compact and reasonable, and the overall assembly is relatively better.

In the embodiment, a through output line hole 16 is provided in the box cover 1, and a melt glue groove is provided in the corresponding box cover 1. The melt glue groove is configured for injecting a melt glue to seal a gap between a wire and the output line hole 16, to achieve a waterproof effect.

In the foregoing, a battery pressing plate 26 is disposed at an upper edge of the battery groove unit 211, and the battery pressing plate 26 is configured to fix a battery mounted in the battery groove unit 211.

According to the present invention, by optimizing a design and by using a cylindrical structure design, threaded fastening and fitting among the box cover, the compartment body, and the box body can be implemented, to reduce a sealing space and improve a sealing effect; and the structure of the compartment body and the box cover is optimized, so that the product parts are more concise, and less parts are required, facilitating assembly of the battery box body.

It can be known from the technical knowledge that the present invention can be implemented by other embodiments which are not separated from spiritual essence or necessary features of the present invention. Therefore, the above-disclosed embodiments are merely illustrative and not exclusive in all respects. All changes which are within the scope of the present invention or equivalent to the scope of the present invention are encompassed by the present invention.

What is claimed is:

1. A cylindrical waterproof battery box, comprising a box body, a compartment body, and a box cover, wherein one end of the box body is provided with a mounting opening, the compartment body is configured to be mounted into the mounting opening and extend into an inner cavity of the box body, the box cover and the compartment body are of a split structure and the box cover can be clamped and fixed to one end of the compartment body in a fitting manner to form an external thread assembly portion,
   an accommodating cavity capable of accommodating a switch circuit board is formed after the box cover and the compartment body are assembled, the switch circuit board is mounted in the accommodating cavity,
   a through output line hole is provided in the box cover, and a melt glue groove is provided in the corresponding box cover, the melt glue groove is configured for injecting a melt glue to seal a gap between a wire and the output line hole,
   an internal thread portion is disposed in the mounting opening of the box body, and the external thread assembly portion is configured to be fitted with the internal thread portion,
   the box cover comprises an end cover portion, box cover thread portions arranged symmetrically on two sides, and a clamping buckle located between the two box cover thread portions, the compartment body comprises a battery compartment box and a compartment cover portion located on one end of the battery compartment box, the compartment cover portion comprises a cover ring and a cavity groove, clamping grooves are provided on an inner wall of the cavity groove, and the clamping grooves are configured to be fixed to the clamping buckle in a fitting manner; and after the box cover is assembled with the compartment body, the box cover thread portion fills a part of the cavity groove,
   a plurality of battery groove units is disposed in the battery compartment box, each of the battery groove units is configured to mount a battery to supply power for the switch circuit board and a LED lamp string.

2. The cylindrical waterproof battery box according to claim 1, wherein compartment body thread portions arranged symmetrically can further be disposed on the compartment cover portion, and after the box cover is assembled with the compartment body, the box cover thread portions and the compartment body thread portions are combined to form the external thread assembly portion.

3. The cylindrical waterproof battery box according to claim 2, wherein when the box cover and the compartment body are assembled, a first waterproof sealing ring is disposed between the box cover and the compartment body, and when the external thread assembly portion is fitted with the internal thread portion, a second waterproof sealing ring is disposed between the external thread assembly portion and the internal thread portion.

4. The cylindrical waterproof battery box according to claim 3, wherein a switch hole is provided in an end cover portion of the box cover, a switch handle in the switch circuit board extends outward through the switch hole, the switch hole is provided with a button plug in a fitting manner, and an outer end of the switch handle is configured to be fitted with the button plug.

5. The cylindrical waterproof battery box according to claim 4, wherein a first battery accommodating groove is provided in the compartment body, the first battery accommodating groove is adjacent to an assembly groove, two battery groove units are disposed in the first battery accommodating groove, a second battery accommodating groove is further provided in the compartment body, a plurality of battery groove units are disposed in the second battery accommodating groove, and the second battery accommodating groove and the first battery accommodating groove are disposed opposite to each other.

6. The cylindrical waterproof battery box according to claim 5, wherein a battery pressing plate is disposed at an upper edge of one of the battery groove units.

* * * * *